(12) United States Patent
Matsumoto et al.

(10) Patent No.: US 6,530,985 B1
(45) Date of Patent: Mar. 11, 2003

(54) WATER-BASED MAGENTA INK COMPOSITION AND METHOD OF INK-JET RECORDING

(75) Inventors: Hiroyuki Matsumoto, Saitama (JP); Yasuo Shirasaki, Saitama (JP); Katsunori Fujii, Saitama (JP); Yoshiki Akatani, Osaka (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/623,335

(22) PCT Filed: Mar. 4, 1999

(86) PCT No.: PCT/JP99/01050
§ 371 (c)(1),
(2), (4) Date: Aug. 31, 2000

(87) PCT Pub. No.: WO99/46341
PCT Pub. Date: Sep. 16, 1999

(30) Foreign Application Priority Data

Mar. 10, 1998 (JP) .............................. 10-075109
Sep. 28, 1998 (JP) .............................. 10-272373

(51) Int. Cl.[7] .................. C09D 11/00; C09D 11/02; C07D 221/18

(52) U.S. Cl. ...................... 106/31.47; 546/76

(58) Field of Search .......................... 106/31.47; 546/76

(56) References Cited

U.S. PATENT DOCUMENTS

| | | | |
|---|---|---|---|
| 2,644,821 A | | 7/1953 | Peter et al. ................. 260/278 |
| 5,183,892 A | * | 2/1993 | Nakamatsu et al. ....... 106/287.2 |
| 5,367,075 A | * | 11/1994 | Nakamatsu et al. .......... 546/76 |
| 6,152,969 A | * | 11/2000 | Matsumoto et al. .......... 546/76 |

FOREIGN PATENT DOCUMENTS

| | | |
|---|---|---|
| JP | 57-195775 | 12/1982 |
| JP | 59-74173 | 4/1984 |
| JP | 2-16171 | 1/1990 |
| JP | 3-100502 | 4/1991 |
| JP | 8-29771 | 2/1996 |

OTHER PUBLICATIONS

Copy of the International Search Report dated Jun. 8, 1999.

* cited by examiner

*Primary Examiner*—Helene Klemanski
(74) *Attorney, Agent, or Firm*—Nields & Lemack

(57) ABSTRACT

The present invention relates to a water-based magenta ink composition which has satisfactory storage stability, has a hue and vividness suitable for ink-jet recording, and gives prints having high fastness to light and water, and a magenta dye suitable therefor. More particularly, the present invention relates to a water-based magenta ink composition characterized by containing a disulfonic acid derivative of a compound represented by Formula (2)

(2)

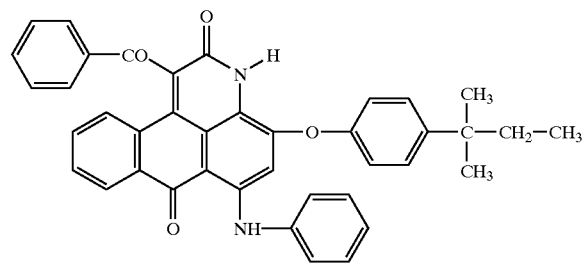

or the salt thereof as the dye component, an ink-jet recording method using said composition, and magenta dye containing little inorganic salt and little mono-sulfonic acid compound and being suitable for the said composition.

16 Claims, 1 Drawing Sheet

■ : Example 2
● : Comparative Example 1

■ : Example 2

● : Comparative Example 1

WATER-BASED MAGENTA INK COMPOSITION AND METHOD OF INK-JET RECORDING

TECHNICAL FIELD

The present invention relates to an ink composition, more particularly to a water-soluble magenta ink composition for ink-jet recording, which contains an anthrapyridone disulfonic acid compound or the salt thereof as the colorant having a wide range of blend color and an excellent property in color tone, light fastness and water fastness; an ink-jet recording method using said composition; an water-based magenta dye comprising said disulfonic acid compound or the salt thereof having a low content of inorganic salt; and a method for producing said disulfonic acid compound or the salt thereof having a low content of said inorganic salt.

BACKGROUND ART

Diverse ink jetting processes have been developed for the recording method by ink-jet printer, and each method comprises the process of generating ink droplets and then depositing them onto various recording materials (such as paper, film, cloth). The recording method by means of ink-jet printer has rapidly been spread in recent years and will be propagated in future because the method makes no noise due to the system in which a recording head does not contact with the recording material and because the method advantageously allows the printer easily to be downsized, to work in a high-speed and to give color printing. In order to record in color an image information or a character information on a computer color display by an ink-jet printer, it is generally printed to by subtractive color mixing of four colored-inks, namely yellow, magenta, cyan and black. In order to reproduce an image pictured by additive color mixing of R, G ,B on a CRT display as identical as possible by subtractive color mixing, the dyes used therefor, especially for a YMC ink, are desired to have color hues close to the respective standards of YMC ("Japan Color Standard Paper" published by Japan Printing Machinery Manufacturers Association)and vividness. Additionally, it is required that the resulting ink composition is stable for long-term storage and that the resulting printed image is of a high optical density and has excellent fastness including water fastness and light fastness. The present invention relates to a magenta ink.

The use of ink-jet printers are enlarged from a small-sized one for OA to a big-sized one for industrial use. So, there arise a keen demand more than ever on fastness such as water fastness and light fastness of the printed image. The water fastness is substantially improved by coating inorganic or organic micro particles such as cationic polymer (not an inorganic particle), porous silica, alumina sol and special ceramics which can absorb dye from ink with PVA resin on a paper sheet. Various coated sheets for ink-jet printing are already available on the market, but they can not always give a satisfactory water fastness. Light fastness is not yet improved by an established technique. Especially, the majority of magenta dyes, one of four original colors of YMCK, are poor in light fastness, and its improvement is an important problem to be solved.

The chemical skeletal structure of magenta dyes used in a water-soluble ink for ink-jet recording is represented by a xanthene type disclosed by JP Laid-Open No.89811/1979, JP Laid-Open No.60053/1996 and JP Laid-Open No.143798/1996, or an azo type using the H acid disclosed by JP Laid-Open No.62562/1986, JP Laid-Open No.156168/1987, JP Laid-Open No.203970/1991, JP Laid-Open No.157698/1995 and JP Publication No.78190/1995. The xanthene type is indeed excellent in hue and vividness, but is inferior in light fastness. The azo type using the H acid is good in hue and water fastness, but is inferior in light fastness and vividness. As disclosed by JP Laid-Open No.203970/1991, for example, some magenta dyes excellent in vividness and light fastness have been developed from the azo type family, but are still inferior in light fastness to the other hue of dyes such as yellow dyes and cyan dyes represented by copper phthalocyanine type.

For a chemical skeletal structure of magenta dyes excellent in vividness and light fastness, an anthrapyridone type is known as disclosed by JP Laid-Open No.195775/1982, JP Laid-Open No.74173/1984 and JP Laid-Open No.16171/1990, but is not yet able to satisfy all of the properties in a wide range of blend color, hue, vividness, light fastness, water fastness and stability in solution. The U.S. Pat. No. 2,644,821 discribes an anthrapyridone type compound including the compound of below Formula (2) and its disulfonic acid compound as a good light fastness and water fastness of dye, but they are intended to use mainly for fiber-dyeing and can not show a high quality suitable for an ink-jetting ink, if used directly with no additional procedures.

An object of the present invention is to provide a water-based magenta ink composition which has a wide range of blend color in hue and vividness suitable for ink-jet recording and gives the recorded material a high fastness in light fastness and water fastness; and a magenta dye suitable therefor.

DISCLOSURE OF THE INVENTION

The present inventors made a diligent study to solve the above problem and, as a result, have completed the present invention. Namely, the present invention is as follows:

(1) A water-based magenta ink composition, which comprises the disulfonic acid derivative of a compound represented by Formula(2) or the salt thereof as the dye component.

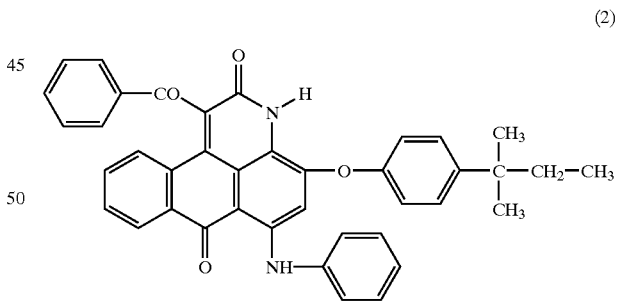

(2)

(2) A water-based magenta ink composition according to the above term (1), wherein said disulfonic acid derivative of a compound represented by Formula(2) is 85% or more (area ratio according to high performance liquid chromatography(HPLC)) in content and a monosulfonic acid compound of the compound represented by Formula (2) according to the above terms (1) is 10% or less(area ratio according to HPLC)in content.

(3) A water-based magenta ink composition according to the above term (1) or (2), wherein said disulfonic acid compound is a compound (or the salt thereof, hereinafter likewise) represented by Formula(1).

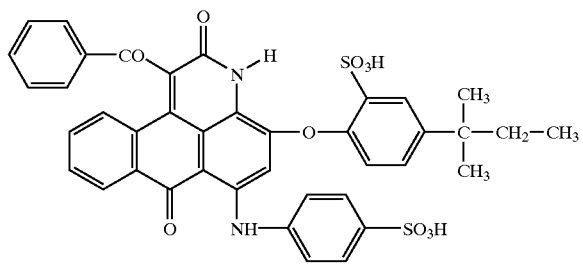

(1)

(4) A water-based magenta ink composition according to any of the above terms (1) to (3), wherein said composition contains water and an organic solvent.
(5) A water-based magenta ink composition according to any of the above terms (1) to (4), wherein an inorganic salt in said dye component is 1% or less in content.
(6) A water-based magenta ink composition according to any of the above terms (1) to (5), wherein said composition is for ink-jet recording.
(7) A method for ink-jet recording, which comprises using the water-based magenta ink composition according to any of the above terms (1) to (5) for an ink in the ink-jet recording way that ink droplets are jetted responding to recording signals to record on a recording material.
(8) A method for ink-jet recording, which comprises using the water-based magenta ink composition according to any of the above terms (1) to (5) for a magenta ink, and using a water-based cyan ink containing a water-soluble metal phthalocyanine dye for a cyan ink in the ink-jet recording way that ink droplets are jetted responding to recording signals to record on a recording material.
(9) A method for ink-jet recording according to the term (8), wherein said recording material is a polyamide fiber material, which is thermally treated after jetting said ink composition.
(10) A method for ink-jet recording according to the term (8), wherein said recording material is a sheet for information transmitting.
(11) A method for ink-jet recording according to the term (10), wherein said sheet for information transmitting is a surface-treated sheet.
(12) An ink-jet printer, which comprises being equipped with a container storing the water-based magenta ink composition according to any of the above terms (1) to (5) and a container storing the water-based cyan ink containing a water-soluble metal phthalocyanine dye.
(13) A dye for water-based magenta ink, which comprises containing the disulfonic acid compound represented by Formula(1) or the salt thereof by 90% or more(area ratio according to HPLC), the monosulfonated product (monosulfonic acid compound) of the compound represented by Formula(2) by 5% or less(area ratio according to HPLC), and the inorganic salt by 1% or less.
(14) A method for producing the disulfonic acid compound represented by Formula (1) or the salt thereof, which comprises disulfonating the anthrapyridone compound represented by Formula (2) with fuming sulfuric acid, salting out conventionally the disulfonic acid compound thus obtained to give a wet cake, and then treating the wet cake with a hydrous lower alcohol.

DESCRIPTION OF SYMBOLS

Figure 1:
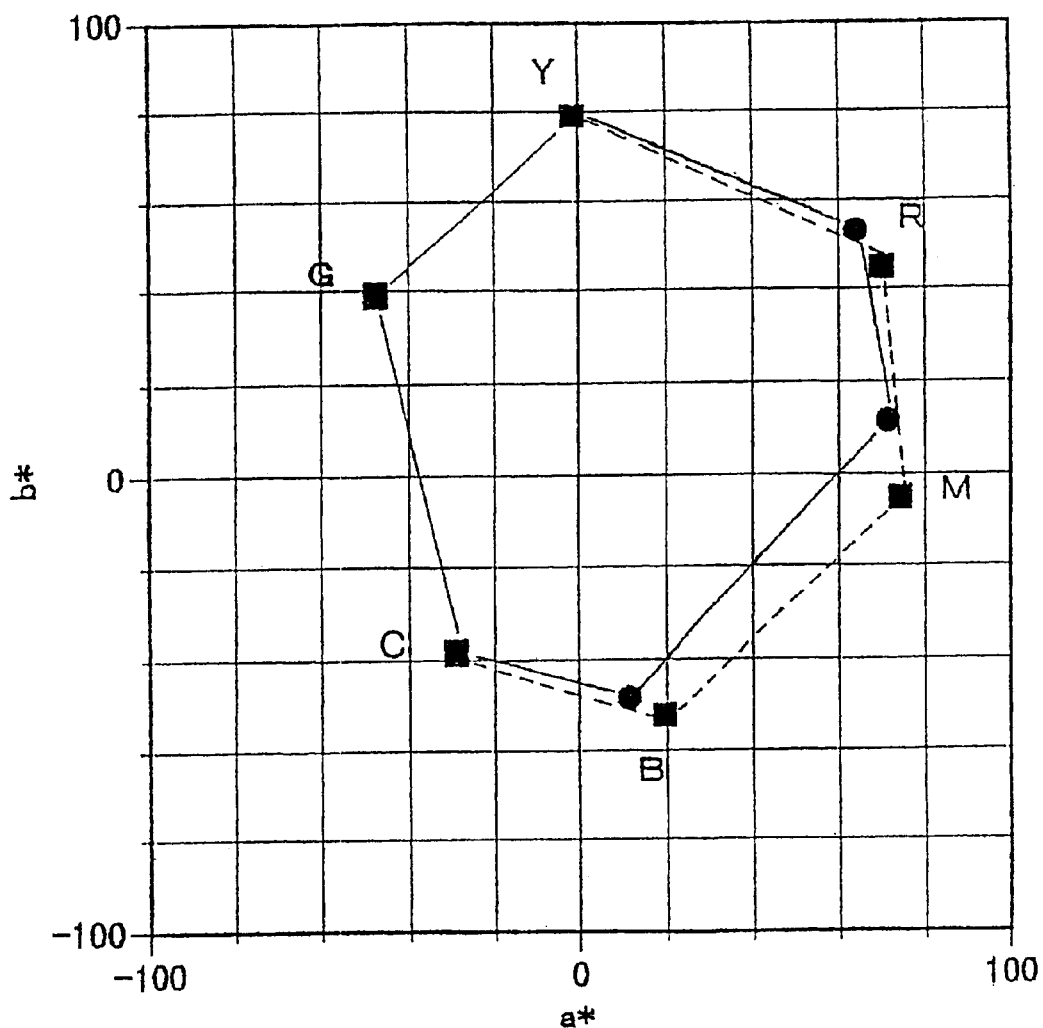
FIG. 1 is a diagram showing the range of blend color of the dyes.

In FIG. 1, the axis X represents a*, and the axis Y represents b* on the L* a* b* calorimetric system. Y shows yellow, R shows red, M shows magenta, B shows blue, C shows cyan and G shows green. The solid line expresses the range of blend color of the dyed product in Example 2 and the dotted line expresses the range of blend color of the dyed product in Comparative Example 1.

BEST MODE FOR CARRYING OUT THE INVENTION

The water-based magenta ink composition of the present invention is characterized by containing the disulfonic acid compound of the compound represented by the above Formula(2)or the salt thereof. The disulfonic acid compound of the compound represented by the above Formula(2)is 85% or more, preferably 90% or more, more preferably 92% or more, and specially preferably 95% or more in content in the dye component by area ratio according to HPLC (hereinafter measured in the condition as described below: Column: Inertsil ODS-2(6.0, I,D, 150 mm), Mobile Phase: $CH_3CN/0.05$ wt % $NH_4H_2PO_4$=40/60(w/w), Flow Rate: 0.8 ml/min, Col. Temp.:40° C., Detector: UV-254 nm). An example of the disulfonic acid derivative of the compound represented by the above Formula(2) is represented by the above Formula (1).

The dye component used in the present invention, which is obtained by sulfonating the compound represented by the above Formula(2), contains the monosulfonic acid compound by-produced in the production process in addition to the disulfonic acid. The content of the monosulfonic acid compound is desirably as low as possible for the purpose of easy ink production (for example, filtration), ink storage stability and vividness of the recorded product, and is 10% or less(including 0%), preferably 5% or less, more preferably 2% or less and specially preferably 1% or less. It is of course best that the ink composition of the present invention contains no compound of Formula (2).

The dye component used in the present invention can be obtained by sulfonating the compound represented by Formula (2) (the compound of Formula (2) is described in U.S. Pat. No. 2,644,821) in sulfuric acid containing fuming sulfuric acid. The concentration of fuming sulfuric acid in sulfuric acid is preferably 5 to 12% by weight, more preferably 6 to 10% by weight. The reaction temperature is generally 0 to 60° C., preferably 10 to 30° C. Further, the reaction time varies depending on the reaction temperature, but is generally 5 minutes to 20 hours, and about 30 minutes to 5 hours in an preferable embodiment. The sulfonation terminates when no compound of the formula (2) is identified and the monosulfonic acid compound decreases in concentration to 10% or less, preferably 5% or less, more preferably 2% or less, especially preferably 1% or less in concentration according to the HPLC area ratio. After the completion of the reaction, the reaction solution is poured in an ice-water, followed by salting out, filtration and drying, to obtain the dye containing the compound of Formula (1) (hereinafter, representing the dye containing the monosulfonic acid compound and the disulfonic acid compound). The product is desired to be treated with a lower alcohol such as methanol and ethanol upon necessity to make a dye having a low content of inorganic salt suitable for the ink composition of the present invention. It is sufficient for the treatment to conduct a desalting treatment, for example, by a conventional method such as reverse osmotic membrane or by stirring a dry product or a wet cake, preferably a wet cake of the dye component of the present invention in hydrous lower alcohol, preferably in a mixed solvent of methanol and water, then filtering and drying. Either treatment is possible, however, the latter one is more preferable. The preferable amount of a solvent in the latter treatment is about 1 to 20 times(by weight), preferably 2 to 10 times that of the dry product or the wet cake. There is no limit in treatment time as it varies depending on a treatment amount, an amount of hydrous lower alcohol and the other condition, but it is generally several minutes to several hours, preferably about 10 mins to 3 hrs. There is no limit in treatment temperature, in particular, but is generally 10 to 40° C., preferably an ambient temperature. The alcohol content in a hydrous lower alcohol is generally 20% to 95% by weight, preferably 50% to 90% by weight, more preferably 70% to 85% by weight.

The dye thus obtained exists as a free acid or the salt thereof. The alkali metal salt, the alkali earth metal salt, the alkylamine salt, the alkanolamine salt or the ammonium salt may be used in the present invention. The preferable salt includes an alkali metal salt such as the sodium salt, the potassium salt and the lithium salt, and an alkanolamine salt such as the monoethanolamine salt, the diethanolamine salt, the triethanolamine salt, the monoisopropanolamine salt, the diisopropanolamine salt and the triisopropanolamine salt.

The dye component thus obtained contains the monosulfonic acid compound and the inorganic salt in their least amounts and, therefore, is suitable for an ink composition of the present invention. The content of monosulfonic acid compound, for example, can be decreased to 10% or less (including 0%), preferably 5% or less, more preferably 2% or less, specially preferably 1% or less relative to the total dye component according to the HPLC area ratio. The content of the inorganic salt can be decreased to 5% or less, preferably 3% or less, more preferably 1% or less relative to the total dye component. The content of the inorganic salt can be determined by measuring $Cl^-$ and $SO_4^{2-}$ according to ion chromatography; heavy metals according to atomic absorption spectrography or inductively coupled plasma emission spectrography; or $Ca^{2+}$ and $Mg^{2+}$ according to ion chromatography, atomic absorption spectrography or inductively coupled plasma emission spectrography.

The water-based ink composition of the present invention can be obtained by dissolving the above dye component in water or a hydrous solvent(a water containing organic solvent as will be described later). The preferable ink pH is about 6 to 11. The more preferable dye component of a water-based ink composition, when used in an ink-jet recording printer, contains an inorganic material such as the chloride and the sulfate of a metal positive ion in the amount as little as possible. For example, the total content of sodium chloride and sodium sulfate in the dye component is 1% by weight or less, preferably 0.5% or less, more preferably 0.1% or less.

The water-based ink composition of the present invention is prepared by using water as a medium and contains the dye component preferably by 0.1 to 20%, more preferably 1 to 10%, more preferably 2 to 8% by weight. The water-based ink composition of the present invention also may contain a water-soluble organic solvent 60% or less, preferably 50% or less, more preferably 40% or less, the most preferably 30% or less by weight. The lower limit may be 0% by weight, but is generally 5% or more, more preferably 10% or more, the most preferably 10 to 30% by weight. The water-based ink composition of the present invention may contain ink regulators by 0 to 10%, preferably 5% or less by weight. The remainder except the above components is water.

The water-soluble organic solvent includes a C1–C4 alkanol such as methanol, ethanol, propanol, isopropanol, butanol, isobutanol, secondary butanol and tertiary butanol; a carboxylic amide such as N,N-dimethylformamide and N,N-dimethylacetoamide; a lactam such as ε-caprolactam and N-methylpyrrolidin-2-one; urea; a cyclic urea such as 1,3-dimetylimidazolidin-2-one or 1,3-dimethylhexahydropyrimid-2-one; a ketone or a keto-alcohol such as acetone, methyl ethyl ketone, and 2-methyl-2-hydroxypentan-4-one; an ether such as tetrahydrofuran and dioxane; mono-, oligo- or poly-alkylene glycol or thioglycol having C2–C6 alkylene units, such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol and polypropylene glycol; polyols (triols) such as glycerin and hexane-1,2,6-triol; C1–C4 alkyl ethers of polyhydric alcohols, such as ethylene glycol monomethyl ether, ethylene glycol monoethyl ether, diethylene glycol monomethyl ether, diethylene glycol monoethyl ether, triethylene glycol monomethyl ether, and triethylene glycol monoethyl ether; γ-butyrolactone; and dimethylsulfoxide. These solvents may be used in a combination of two or more. Two or more of these are in many cases combined to use.

Among these water-soluble organic solvents, preferable examples are N-methylpyrrolidin-2-one and mono-, di- or tri-alkylene glycol having C2–C6 alkylene units(mono-, di- or triethylene glycol, dipropylene glycol), glycerine, and dimethylsulfoxide. At least one or a combination of two or more selected from the above mentioned groups consisting of them is preferably used. At least one selected from the group consisting of N-methylpyrrolidin-2-one, glycerine, ethylene glycol, diethylene glycol and dimethylsulfoxide is especially preferably used.

The ink regulators, which are all the components except water, a dye component and a water-soluble organic solvent, include a preservative, a pH adjusting agent, a chelating agent, a rust preventive, a water-soluble ultraviolet absorbing agent, a water-soluble polymeric compound, a dye dissolving agent, and a surfactant. The preservative includes sodium dehydroacetate, sodium sorbate, sodium 2-pyridinethiol-1-oxide, sodium benzoate and sodium pentachlorophenol. The pH adjusting agent includes any substance that can control the ink pH within a range of 6 to 11 with no adverse effect on the ink preparation. The examples are alkanolamines such as diethanolamine and triethanolamine; alkali metal hydroxides such as lithium hydroxide, sodium hydroxide, and potassium hydroxide; ammonium hydroxide; or alkali metal carbonates such as lithium carbonate, sodium carbonate and potassium carbonate. The chelating reagent includes sodium ethylenediaminetetraacetate, sodium nitrilotriacetate, sodium hydroxylethylenediaminetriacetate, sodium diethylenetriaminepentaaceate, and sodium uramil diacetate. The rust preventive includes acidic hyposulfite salts, sodium thiosulfate, ammonium thioglycolate, diisopropylammonium nitrite, tetranitrate pentaerythritol, and dicyclohexylammonium nitrite.

The ink composition of the present invention is prepared by adding the above dye and the above water-soluble organic solvent and the ink regulators upon necessity to water such as distilled water with no impurities contained therein and mixing them together. Alternatively, the dye may be added to dissolve in a mixture of water, the above water-soluble organic solvent and the ink regulators. The resulting ink composition may be filtered, if necessary, to remove the contaminants from the composition.

A recording material used in ink-jet recording includes an information transmittance sheet such as paper and film, fiber and leather.

It is preferable that the information transmittance sheet is surface-treated and, practically, is set with an ink-acceptable layer on the base material. The ink-acceptable layer can be set, for example, by impregnating or coating a cationic polymer on the above basement material; or by coating an inorganic fine-grain which can absorb the dye from an ink such as porous silica, alumina sol and special cebamic together with a hydrophilic polymer such as polyvinyl alcohol and polyvinyl pyrrolidone on the above base material. The sheet set with such an ink-acceptable layer is generally called an ink-jet special paper (film)or a glossy paper (film), and is available on the market, for example, as Pictorico(by Asahi Glass KK), Color BJ Paper, Color BJ Photofilm sheet(by Canon KK), Color Image Jet special paper(by Sharp KK), Superfine special glossy film(by Seiko Epson KK)and Pictafine(by Hitachi Maxell KK). A plain paper can be of course used for a recording material.

The preferable fiber is a polyamide fiber such as nylon, silk and wool, and is of nonwoven fabric or cloth. The fiber can be dyed by adhering an ink composition of the present invention to said fiber preferably by ink-jet recording, and then fixing by wet heating(for example, at about 80 to 120° C.) or dry heating(for example, at about 150 to 180° C.) to give the dyed product which is excellent in vividness, light fastness and washing fastness.

A method for ink-jet recording of the present invention can be carried out, for example, by setting an ink-jet printer with the container containing the above water-base magenta ink composition, and then recording conventionally on a recording material. The ink-jet printer includes a piezo type printer utilizing the mechanical vibration and a bubble-jet type printer using bubbles generated by heating.

In the method for ink-jet recording of the present invention, the above water-based magenta ink composition is used together with a yellow ink composition, a cyan ink composition, and a black ink composition upon necessity. The water-based cyan ink composition, if it contains a soluble metal phthalocyanine dye, is preferably used together with the above water-based magenta ink composition to give a good result that the color tone changes hardly in a light fastness test after color-mixing. Metals in the water-soluble metal phthalocyanine dye includes copper, nickel and aluminium, and copper is preferable. The water-soluble copper phthalocyanine dye includes C.I.direct blue86, C.I.direct blue87, C.I.direct blue199, C.I.acid blue249, C.I.reactive blue7, C.I.reactive blue15, C.I.reactive blue21 and C.I.reactive blue71.

The water-based cyan ink composition containing the water-soluble metal phthalocyanine dye is produced, for example, by a method similar to that of the above water-based magenta ink composition and injected in a container, which is set at the prescribed position of an ink-jet printer to use in the same way as the container of the above water-based magenta ink composition.

The water-based ink composition of the present invention can give an ideal magenta color which has vividness, color tone indicated in the above "Japan Color Standard Paper", high tinge and moderate blueness, and therefore, can be used together with a yellow or cyan ink to give a wide visible range of color tone. Further, the composition can be used together with existing yellow, cyan and black excellent in light fastness and water fastness to give a recorded product excellent in light fastness and water fastness.

EXAMPLE

The present invention will be described below in more details with reference to Synthesis Example and Example. "part" and "%" in the description are shown by weight unless otherwise specified.

Synthesis Example 1

63.7 parts of 96% sulfuric acid was charged in a reactor, followed by addition of 65.9 parts of 32.7% fuming sulfuric acid thereto under cooling on ice, to prepare 7.9% fuming sulfuric acid. 20.4 parts of the Compound of Formula(2) was added thereto below 20° C. under cooling on ice, sulfonated at a temperature of 20 to 25° C. for 3 hours, and then added to 300 parts of icy water, followed by addition of 20 parts of sodium chloride under stirring. The solution was stirred for 1 hr, filtered and then washed with 30 parts of 10% aqueous sodium chloride solution to obtain a wet cake. The wet cake was stirred with 300 parts of water for 30 min, and filtered to remove a small amount of insoluble matter. To the filtrate 25 parts of sodium chloride was added under stirring for salting out, followed by stirring for 1 hr. The resultant product was filtered and dried to obtain a reddish powder of the dye component to be used in the present invention.

Alternatively, the wet cake was stirred at the room temperature for 1 hr in methanol 2.3 times as much as the wet cake by weight, filtered, washed with methanol and dried to obtain 24.3 parts of a clearly red crystal of the dye ($\lambda$.max: 529 nm(in water)) containing the compound of Formula (1) and having the least amount of inorganic salt.

The product contained the disulfonic acid compound represented by Formula (1) by 95% or more, monosulfonic acid compound by 1% or less and a total of sodium chloride and sodium sulfate by 1% or less according to the HPLC area ratio.

Example 1

(1) Preparation of the Ink Composition

The water-base ink composition for ink-jet printing was produced by preparing a liquid of the composition as described in Table 1 below and filtering through a 0.45 $\mu$m membrane filter (by Toyo Roshi KK). The composition deposited no crystal even after 6 months of the production and so had good storage stability.

TABLE 1

| (Composition) | |
|---|---|
| Dye containing the compound of Formula(1)(note) | 4.5 parts |
| Water | 75.5 parts |
| N-methylpyrrolidine-2-one | 5.0 parts |
| Ethylene glycol | 5.0 parts |
| Glycerin | 5.0 parts |
| Urea | 5.0 parts |
| Total | 100.0 parts |

(note) the monosulfonic acid compound content of 0.5% or less(measured by HPLC in the above condition); the total content of sodium chloride and sodium sulfate of 1% by weight or less; solubility in pure water(ion exchanged water) of about 100 g/L (25° C.)

(2) Ink-jet Recording

By using an inkjet-printer (Trade name: NOVAJET III, by ENCAD CO.), ink-jet recording was done on an available coated sheet (Coatedpaper STX73A4 for color image jet; by Sharp, Co.).

(3) Hue and Vividness of Recorded Image

A recorded paper was applied to COMSEK-V colorimetric system (by Nippon Kayaku KK) to calculate L*, a*, b* values. Hue was evaluated by comparison with color samples of standard magenta of the "Japan Color Standard Paper" published by Japan Printing Machinery Manufacturers Association (JNC), and vividness was evaluated by the formula:

$$C^* = ((a^*)^2 + (b^*)^2)^{1/2}$$

(4) Light Fastness Test of Recorded Image

A carbon arc fade meter (by Suga Testing Machine Co.) was used to irradiate carbon arc on the recorded papers for 20 hours. Change between before and after the irradiation treatment was determined according to JIS blue scale, and color difference between before and after the irradiation treatment was measured by the above colorimetric system.

(5) Water Fastness Test of Recorded Image

A recorded paper was immersed in a beaker of water, stirred for 2 minutes, picked out, and air-dried. Change between before and after the immersion treatment was determined according to JIS brown gray scale, and color difference between before and after the immersion treatment was measured by the above calorimetric system.

Test results in hue, vividness, light fastness, and water fastness of recorded images printed by the water-based magenta ink composition prepared in Example 1 are shown in Table 2.

TABLE 2

| | Hue | | | Vividness | Light fastness Judgment | Water fastness Judgment |
|---|---|---|---|---|---|---|
| | L* | a* | b* | C* | (ΔE) | (ΔE) |
| JNC Standard Magenta | 46.3 | 74.4 | −4.4 | 74.5 | | |
| Ink composition of Example 1 | 47.7 | 73.1 | −11.4 | 74.0 | Grade 4 (8.3) | Grade 4 (10.2) |

Table 2 reveals that the ink composition of Example 1 is excellent because the magenta is close to the standard magenta in hue and vividness and the differences in color is little between before and after the respective test of light fastness and water fastness. Further, the dye component used in the Example, which has a solubility in water of 100 g/L, is excellent for ink-jet recording and can produce a high concentration of ink composition.

Example 2

(1) Preparation of Ink Composition

A magenta ink composition was produced by the same way as described in Example 1 except that 3.8 parts of the dye containing the compound of Formula (1) and 76.2 parts of water were used. For Comparative Example 1, a magenta ink composition was produced by using the dye(M-2:C.I. (Color Index) Acid Red 82) as described in JP Laid Open No.195775/1982 and adjusting its optical density to be equal to the above ink composition.

(2) Ink-jet Printing

In order to determine the range of blend color, the above (1) ink composition for a magenta ink composition, the yellow ink and the cyan ink attached to a printer were used to print in unicolor and blend color(red, blue), where the ink-jet printer(Trade name: BJF-600, by Canon KK) and the available coated sheet(Coated paper STX73A4 for color image jet; by Sharp, Co.) were used.

(3) Determination of Color a*, b*, and C* were calculated according to the way as described in Example 1(3). The results are shown in Table 3 and FIG. 1.

TABLE 3

| | | red | magenta | blue | yellow | cyan | green |
|---|---|---|---|---|---|---|---|
| a* | Exam. 2 | 69.6 | 74.1 | 19.5 | −1.4 | −28.9 | −47.8 |
| | Comp. 1 | 63.8 | 71.1 | 11.2 | | | |
| b* | Exam. 2 | 44.3 | −5.6 | −52.5 | 78.6 | −38.9 | 38.6 |
| | Comp. 1 | 52.9 | 11.3 | −48.6 | | | |
| C* | Exam. 2 | | 74.3 | | | | |
| | Comp. 1 | | 72.0 | | | | |

Exam. 2 Example 2;
Comp. 1 Comparative Example 1

Table 3 reveals that the magenta used in the present invention is −5.6 in b* which is shifted by 16.9 toward the minus direction from that of the magenta of Comparative Example 1, so that the former is an ideal magenta color having a moderate blueness. The blue obtained by mixing the cyan also is −52.5 in b*, so that it has a more strong blueness. It is found by plotting a* and b* values of Table 3 on a chromaticity diagram that the magenta of the present invention has a wider range than that of Comparative Example 1 in the field of +a* and −b*, which means said magenta can exert more hue by a blend color in this field. Furthermore, the magenta used in the present invention has a higher value of C*, the indicator of vividness, which means it has a higher vividness. These results show that a higher vividness, a wider range of blend color and, particularly, a more excellent B(blue) and M(magenta) can be obtained when the ink composition of Example 2 is used. The same tests of light fastness and water fastness conducted on the sample of Comparative Example 1 as on the sample of Example 1 reveal that it is of grade 4 in light fastness but is grade 3 in water fastness so that it is inferior in water fastness to the magenta used in the present invention.

Example 3

(1) Preparation of Ink Composition

A magenta ink composition was produced by preparing and filtering in the same way as described in Example 1 except the case in which the magenta dyes as described below were used.

Magenta Dye

M1: the magenta dye used in the present invention
M2: the available ink (containing an azo type dye) for as ink-jet printer Cyan Dye C1: C.I.direct blue 86(cupric phthalocyanine type dye)
C2: C.I.direct blue 199(cupric phthalocyanine type dye)
C3: C.I.reactive blue 71(cupric phthalocyanine type dye)

(2) Ink-jet Printing

The ink-jet record was conducted according to Example 1 by using the ink-jet printer (Trade name: NOVAJET III, by ENCAD CO.)with a magenta ink alone or with a magenta ink and a cyan ink overlapped to an available plain paper (PB PAPER, by Canon KK) and the glossy paper(Color BJ photo sheet film(CA-101)by Canon KK)having the dye-acceptable layer on them.

(3) Light Fastness Test of Recorded Image

The recording paper printed in (2) was subject to a 48 hrs light fastness test using the acceleration type xenon light fastness tester made by WACOM.

(4) Determination of Color

Hues of the recorded image before and after the light exposure were measured to calculate the olor difference($\Delta E$) using the colorimeter(GRETAG SPM59, by GRETAG Co.). The results are shown in Table 4.

TABLE 4

| No. | General paper | Enameled paper | Remark |
| --- | --- | --- | --- |
| 1-1 | 11.3 | 9.6 | M1 alone |
| 1-2 | 6.1 | 7 | M1 and C1 overlapped |
| 1-3 | 3.0 | 5.8 | M1 and C2 overlapped |
| 1-4 | 6.6 | 6.9 | M1 and C3 overlapped |
| 2-1 | 11.1 | 13.5 | M2 alone |
| 2-2 | 12.6 | 17.8 | M2 and C1 overlapped |
| 2-3 | 11.3 | 15.3 | M1 and C2 overlapped |
| 2-4 | 10.2 | 23.5 | M1 and C3 overlapped |

In Table 4, No.1-1 to No.1-4 are the present invention samples and No.2-1 to No.2-4 are the reference samples. In Comparison of No.1-1 with No.2 -1 shows they are of the same level in color difference($\Delta E$)between before and after the exposure on the plain paper. However, the reference sample shows a larger color difference due to the exposure on the glossy paper than on the plain paper; contrary to the above, the present invention sample shows a smaller color difference on the glossy paper than on the plain paper. These facts mean that both the present invention sample and the reference sample have the same level of light fastness on the plain paper, but that the reference sample has a lower and decreased light fastness on the glossy paper than on the plain paper while the present invention sample has a higher and increased light fastness.

The comparison in the results of the magenta dye alone with a combination of the magenta dye and the copper phthalocyanine type cyan dye is as follows. In the reference samples (in comparison of No.2-1 with No.2-2 to 2-4), the color differences in the combination case are almost none or slightly exceed that of the magenta alone on the plain paper, but they increasingly exceed on the glossy paper. On the other hand, in the present invention samples (in comparison of No.1-1 with No.1-2 to 1-4), the color differences in the combinations case are much smaller than that of the magenta alone on both the plain and glossy paper. These facts mean that, in a combination with metal phthalocyanine type cyan dye, the reference sample has the same or decreased light fastness while the present invention sample has an increased light fastness.

Industrial Applicability

The anthrapyridone compound used in the present invention is excellent in solubility in water and is characterized as having a good ability to filter through a filter material such as membrane filter. The anthrapyridone compound is highly safe for a humane body. Furthermore, the ink composition of the present invention using the anthrapyridone compound neither show a crystal deposition after a long storage nor a change in property (for example, an elapse change in viscosity or surface tension) and a color. It has good storage stability. The ink composition of the present invention, when used as a magenta ink for ink-jet recording, can give a printed matter excellent in light fastness and water fastness. Furthermore, the ink composition, when used together with a yellow, cyan or black dye, also enables ink-jet recording excellent in light fastness and water fastness. The ink composition displays the effect strikingly when applied to an information paper, especially to the one having an ink-acceptable layer. The ink composition, when used together with a metal phthalocyanine type cyan dye, can also increase a light fastness, and, additionally, provide a clear printed surface and an ideal magenta color. The ink composition, when used together with a yellow or cyan ink, can provide a wide visible ray range of color tone.

Therefore, the ink composition of the present invention is very useful as a magenta ink for ink-jet recording.

What is claimed is:

1. A water-based magenta ink composition, which comprises the disulfonic acid derivative of a compound represented by Formula (2):

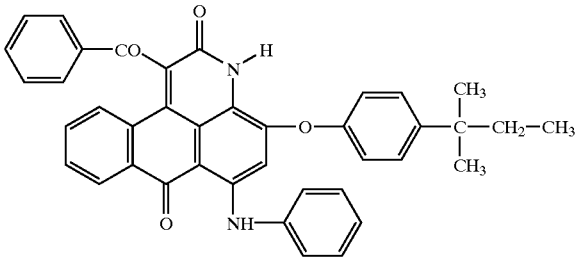

(2)

or the salt or the salt thereof in an amount of 85% or more by area ratio according to HPLC and a monosulfonic acid compound of the compound represented by Formula (2) in an amount of 10% or less by area ratio according to HPLC as the dye component.

2. A water-based magenta ink composition according to claim 1, wherein said disulfonic acid compound is a compound represented by Formula (1)

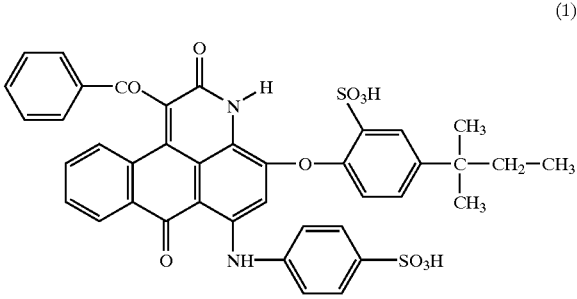

(1)

or a salt thereof.

3. A water-based magenta ink composition according to claim 1, wherein said composition contains water and an organic solvent.

4. A water-based magenta ink composition according to claim 1, wherein an inorganic salt is present in said dye component in an amount of 1% or less.

5. A water-based magenta ink composition according to claim 1, wherein said composition is for ink-jet recording.

6. A method for ink-jet recording, comprising jetting ink droplets in response to recording signals to record on a recording material, said ink droplets comprising the water-based magenta ink composition according to claim 1.

7. A method for ink-jet recording, comprising jetting ink droplets in response to recording signals to record on a recording material, said ink droplets comprising the water-based magenta ink composition according to claim 1, and a water-based cyan ink containing a water-soluble metal phthalocyanine dye.

8. A method for ink-jet recording according to claim 7, wherein said recording material is a polyamide fiber material, which is thermally treated after jetting said ink composition.

9. A method for ink-jet recording according to claim 7, wherein said recording material is a sheet for information transmitting.

10. A method for ink-jet recording according to claim 9, wherein said sheet for information transmitting is a surface-treated sheet.

11. An ink-jet printer equipped with a container storing the water-based magenta ink composition according to claim 1 and a container storing a water-based cyan ink containing a water-soluble metal phthalocyanine dye.

12. A dye for water-based magenta ink, which comprises a disulfonic acid compound represented by Formula (1)

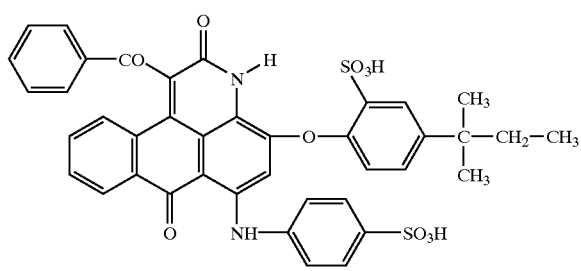

(1)

or the salt thereof in an amount of 90% or more by area ratio according to HPLC, the monosulfonated product of the compound represented by Formula (2)

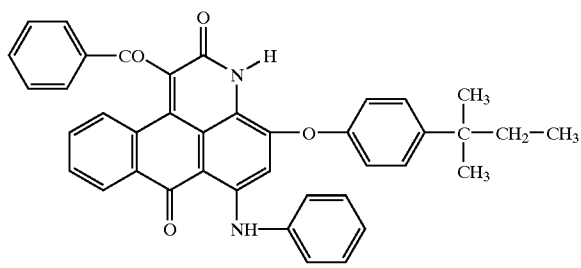

(2)

in an amount of 5% or less by area ratio according to HPLC, and the inorganic salt in an amount of 1% or less.

13. A method for producing a dye comprising the disulfonic acid compound represented by Formula (1)

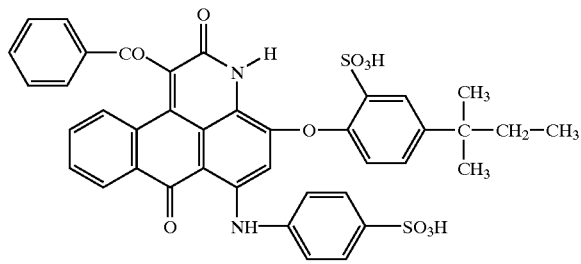

(1)

or the salt thereof in an amount of 85% or more by area ratio according to HPLC and a monosulfonic acid compound of the compound represented by Formula 2

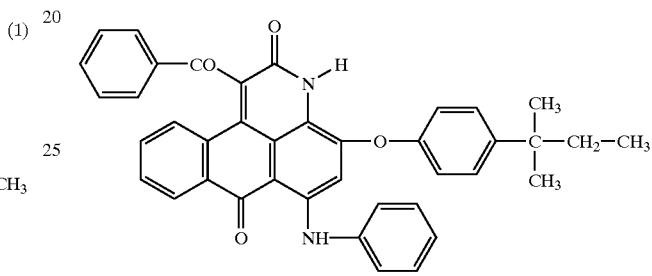

(2)

in an amount of 10% or less by area ratio according to HPLC, which comprises disulfonating the anthrapyridone compound represented by Formula (2) with fuming sulfuric acid, salting out conventionally the disulfonic acid compound thus obtained to give a wet cake, and then treating the wet cake with hydrous lower alcohol.

14. A method for ink-jet recording, comprising jetting ink droplets in response to recording signals to record on a recording material, said ink droplets comprising the water-based magenta ink composition according to claim 4.

15. A method for ink-jet recording, comprising jetting ink droplets in response to recording signals to record on a recording material, said ink droplets comprising the water-based magenta ink composition according to claim 4, and a water-based cyan ink containing a water-soluble metal phthalocyanine dye.

16. A method for ink-jet recording according to claim 15, wherein said recording material is a polyamide fiber material, which is thermally treated after jetting said ink composition.

* * * * *